United States Patent
Chiu

(10) Patent No.: US 8,970,521 B2
(45) Date of Patent: Mar. 3, 2015

(54) METHOD FOR IDENTIFYING TOUCH OBJECT

(75) Inventor: Ching-Ting Chiu, New Taipei (TW)

(73) Assignee: Elan Microelectronics Corporation, Hsinchu (TW)

( * ) Notice: Subject to any disclaimer, the term of this patent is extended or adjusted under 35 U.S.C. 154(b) by 129 days.

(21) Appl. No.: 13/431,144

(22) Filed: Mar. 27, 2012

(65) Prior Publication Data
US 2013/0076700 A1 Mar. 28, 2013

(30) Foreign Application Priority Data
Sep. 22, 2011 (TW) .............................. 100134115 A

(51) Int. Cl.
G06F 3/041 (2006.01)
G06F 3/044 (2006.01)

(52) U.S. Cl.
CPC .............. *G06F 3/044* (2013.01); *G06F 3/0418* (2013.01)
USPC ........... 345/173; 345/156; 345/174; 345/204; 178/18.1; 178/18.9

(58) Field of Classification Search
CPC ... G06F 3/0488; G06F 3/04883; G06F 3/044; G06F 3/04886; G06F 3/045
USPC ........ 345/173, 156, 174, 204; 178/18.1, 18.9, 178/18.01, 18.09
See application file for complete search history.

(56) References Cited

U.S. PATENT DOCUMENTS

| | | | | |
|---|---|---|---|---|
| 5,113,041 A | * | 5/1992 | Blonder et al. | 345/173 |
| 2003/0210235 A1 | * | 11/2003 | Roberts | 345/173 |

* cited by examiner

*Primary Examiner* — Shaheda Abdin
(74) *Attorney, Agent, or Firm* — patenttm.us

(57) ABSTRACT

A method for identifying touch object on a touch panel has steps of (A) reading m capacitance variations on a first direction, wherein the m capacitance variations respectively correspond to m sensed units of the touch panel; (B) determining whether a difference between the capacitance variation of a $k^{th}$ sensed unit and that of another sensed unit exceeds a preset noise ripple, wherein k is equal to or smaller than m, m is a positive integer; (C) determining whether the capacitance variation of the $k^{th}$ sensed unit exceeds those of the adjacent sensed units; and (D) determining a touch stylus touched on the touch panel when the difference exceeds the preset noise ripple and the capacitance variation of the $k^{th}$ sensed unit exceeds those of the adjacent sensed units. Accordingly, the method can correctly identify a range touched by a stylus from the sensed signals combined with LCM noise signals.

16 Claims, 11 Drawing Sheets

|     | j-2 | j-1  | j    | j+1 |
| --- | --- | ---  | ---  | --- |
| i-2 | A10 | A11  | A12  | A13 |
| i-1 | B11 | dV11 | dV12 | B12 |
| i   | B21 | dV21 | dV22 | B22 |
| i+1 | A20 | A21  | A22  | A23 |

FIG.4A

|     | j-2 | j-1   | j     | j+1 |
| --- | --- | ---   | ---   | --- |
| i-2 |     | dV11' | dV12' |     |
| i-1 | B11 | W11   | W12   | B12 |
| i   | B21 | W21   | W22   | B22 |
| i+1 |     | dV21' | dV22' |     |

FIG.4B

|     | j-1   | j     |
| --- | ---   | ---   |
| i-2 | dV11' | dV12' |
| i-1 | W11   | W12   |
| i   | W21   | W22   |
| i+1 | dV21' | dV22' |

FIG.4C

|     | j-1  | j    |
| --- | ---  | ---  |
| i-1 | W11' | W12' |
| i   | W21' | W22' |

FIG.4D

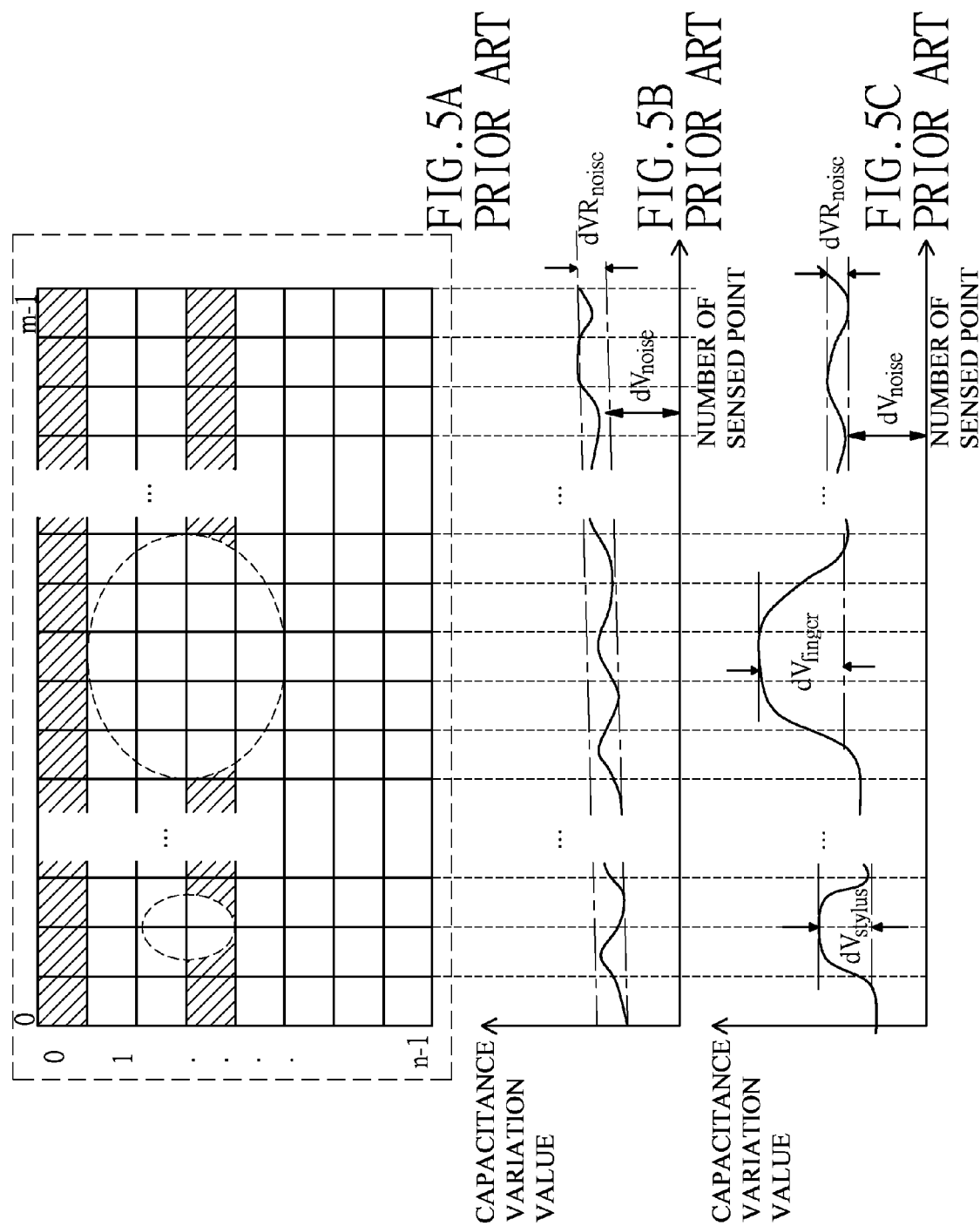

METHOD FOR IDENTIFYING TOUCH OBJECT

BACKGROUND OF THE INVENTION

1. Field of the Invention

The present invention relates to a method for identifying a stylus on a touch panel and more particularly to a method for distinguishing correct sensed signals of touch objects on a touch panel from noises.

2. Description of the Related Art

When a touch panel is mounted on a liquid crystal module (LCM), noises are generated because of the scanning of the scan lines on the LCM and the noises are hereinafter called LCM noises impacting on positional precision of the touch panel in determining touched points on the touch panel. With reference to FIGS. 5A and 5C, capacitance variation values, $dV_{stylus}$ and $dV_{finger}$ are equal to a base value subtracted by the capacitance values of true respective sensed signals of a stylus and a finger therefrom, respectively correspond to control ranges for sensing a stylus and fingers on a touch panel, and increase as a result of the LCM noises. If the capacitance variation values, $dV_{stylus}$ and $dV_{finger}$ need to be correctly calculated, the capacitance variation values caused by the corresponding LCM noises must be deducted therefrom. To tackle the LCM noises, regular approaches preset a fixed noise threshold value and directly deducts the noise threshold value from the capacitance variation values of the sensed signals of stylus or finger so as to avoid the influence of the LCM noises.

However, with reference to FIG. 5B, as the true capacitance variation value of the LCM noise $dVR_{noise}$ is not a constant, it's difficult to decide a fixed noise threshold value. If the noise threshold value is preset to be a relatively low constant, due to the fluctuating $dVR_{noise}$, it is easy for a sensed signal to be incorrectly identified as that of a stylus. On the contrary, true touched points of the stylus may be ignored. Since $dV_{finger}$ is normally greater than $dV_{stylus}$ and $dV_{noise}$, the sensed signals for fingers are not easy to be incorrectly identified as those for other touch objects.

Sensing a stylus or fingers touching on a touch panel is commonplace nowadays. How to correctly identify the position touched by the stylus is definitely the name of the game.

SUMMARY OF THE INVENTION

An objective of the present invention is to provide a method for identifying touch object on a touch panel, which is capable of correctly identifying positions on the touch panel touched by a stylus and being immune to the influence of the noises generated from the liquid crystal module (LCM).

To achieve the foregoing objective, the method for identifying touch object on the touch panel has steps of:

(A) reading m capacitance variation values on a first direction, wherein the m capacitance variation values respectively correspond to m sensed units of the touch panel;

(B) determining whether a difference value between the capacitance variation value of a $k^{th}$ sensed unit and that of another sensed unit is larger than a preset noise ripple value, wherein k is equal to or smaller than m and m is a positive integer;

(C) determining whether the capacitance variation value of the $k^{th}$ sensed unit is larger than those of the adjacent sensed units; and (D) determining a touch stylus touched on the touch panel when the difference value is larger than the preset noise ripple value and the capacitance variation value of the $k^{th}$ sensed unit is larger than those of the adjacent sensed units.

As the slopes of the sensed signals of the stylus are noticeably higher than those of noises, the present invention employs a preset noise ripple value and compares it with a difference value between the capacitance variation value of a $k^{th}$ sensed unit and that of another sensed unit. If the difference value is higher than the preset noise ripple value, the present invention further determines whether the capacitance variation value of the $k^{th}$ sensed unit is larger than those of the adjacent sensed units. If positive, the capacitance variation value of a $k^{th}$ sensed unit can be determined as the capacitance variation value generated by the stylus and the position on the stylus can be further defined. Therefore, the method of the present invention can truly identify the positions touched by the stylus from the sensed signals.

Other objectives, advantages and novel features of the invention will become more apparent from the following detailed description when taken in conjunction with the accompanying drawings.

BRIEF DESCRIPTION OF THE DRAWINGS

FIGS. 3A to 3D are schematic views of four effective coordinates touched by the stylus and identified by the step in FIG. 2C;

FIGS. 4A to 4D are schematic views of four steps for calculating coordinates of positions touched by the stylus in FIG. 3A;

FIG. 5A is a schematic view of a sensing frame of a conventional touch panel;

FIG. 5B is a schematic view of capacitance variation values generated by noises on the sensing frame in FIG. 5A; and FIG. 5C is a schematic view of capacitance variation values corresponding to points touched by a stylus and a finger and affected by the noises on the sensing frame in FIG. 5A.

DETAILED DESCRIPTION OF THE INVENTION

The present invention targets at correctly identifying positions touched by a stylus from sensed signals. The approach of the present invention lies in that slopes of the ascending edges of curves for capacitance variation values of sensed signals of the stylus are noticeably higher than those of the ascending edges of a curve for capacitance variation values of noise signals. Furthermore, a slope for the noise signal is predetermined, and according to the slope for the noise signal, the sensed signals having slopes higher than the slope for the noise signal in a current sensing frame are identified as not caused by LCM noises. If the slope of a sensed signal is higher than the slope for the noise signal and the capacitance variation value of the sensed signal is higher than each of those of adjacent sensed signals, the capacitance variation value of the sensed signal is considered as a sensed signal generated by the stylus. Detailed embodiments follow to describe implementation of the foregoing concepts.

The method for identifying touch object on the touch panel of the present invention may be applied to self-sensing sensing frames or full mutual-scanning sensing frames. As the self-sensing sensing frames include multiple sensing lines respectively generating sensed signals, the method for identifying touch object of the present invention acquires the capacitance variation values of sensed signals on each sensing line and determines the slopes of the sensed signals in accordance with the capacitance variation values. If the slope of a sensed signal is greater than a slope for the noise signal and the capacitance variation value of the sensed signal is greater than those of all the sensed signals, the capacitance variation value of the sensed signal is identified as generated by the stylus.

Figure 1A:
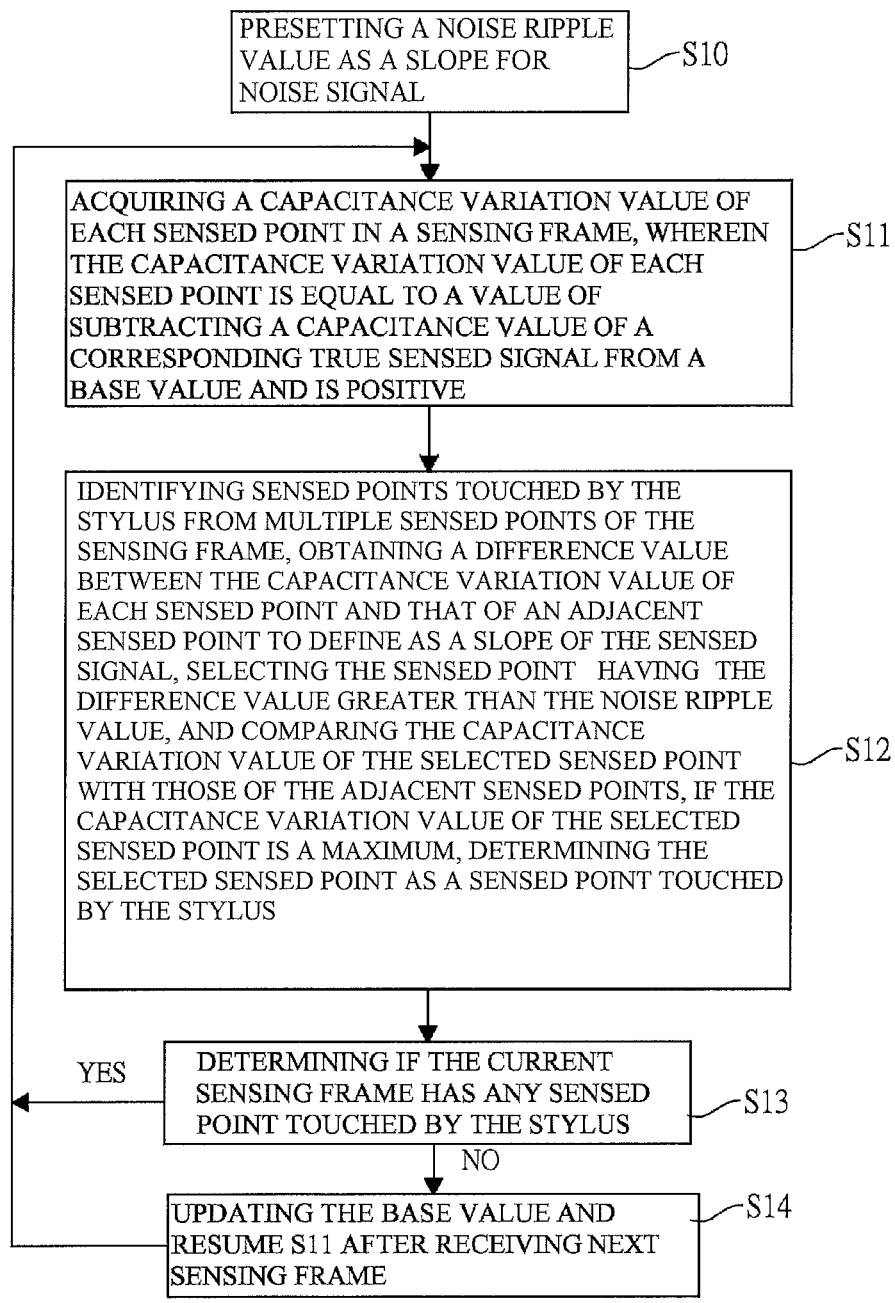
FIG. 1A is a flow diagram of a first embodiment of a method for identifying touch object in accordance with the present invention.
Figure 1B:
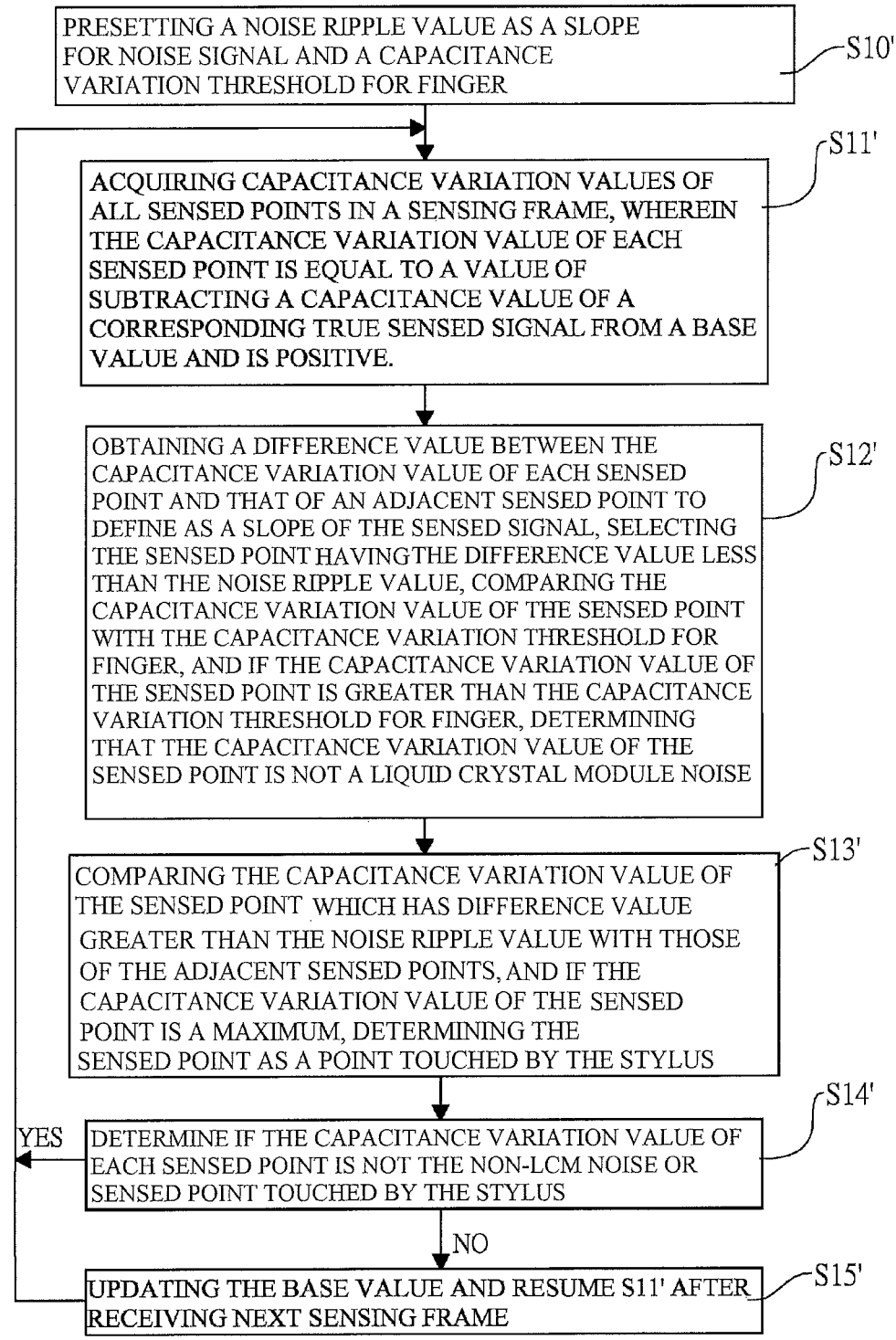
FIG. 1B is a flow diagram of a second embodiment of a method for identifying touch object in accordance with the present invention.
Figure 1C:
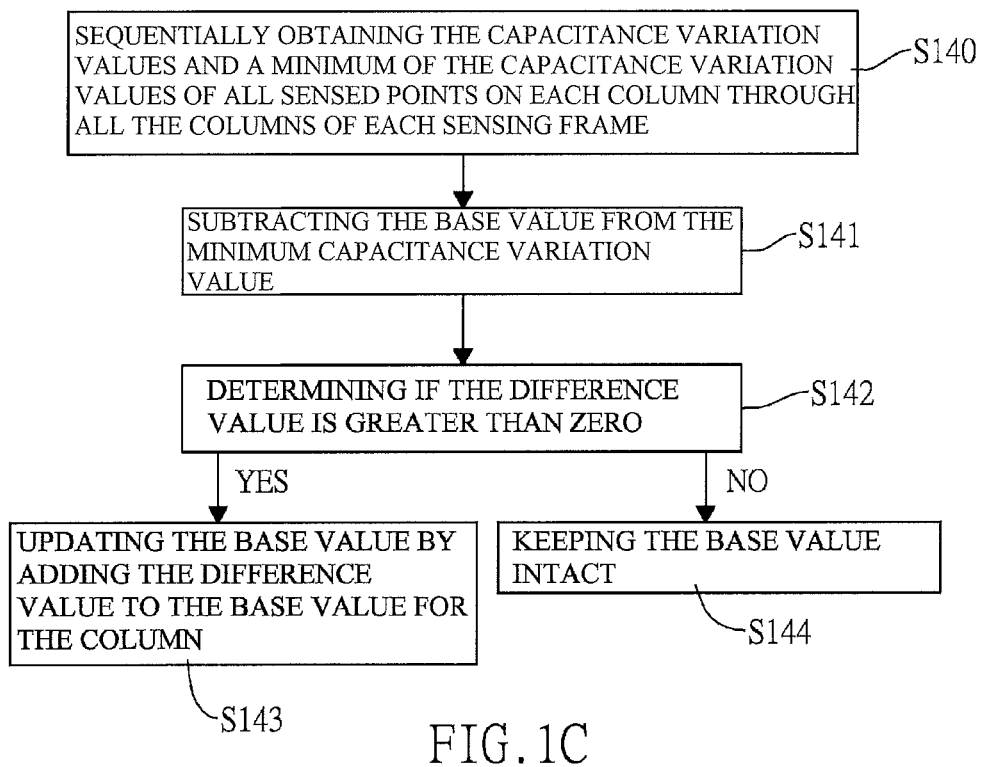
FIG. 1C is a flow diagram of a base value updating step for the methods in FIGS. 1A and 1B.

With reference to FIGS. 1A and 1C, a first embodiment of a method for identifying touch object on the touch panel in accordance with the present invention is applied to full-scanning sensing frames and has the following steps.

Preset a noise ripple value $dVR_{noise}$ as a slope for noise signal (S10).

Acquire a capacitance variation value of each sensed point in a sensing frame (S11). The capacitance variation value of each sensed point is equal to a value of subtracting a capacitance value of a corresponding true sensed signal from a base value and is positive.

Identify sensed points touched by the stylus from multiple sensed points of the sensing frame, obtain a difference value between the capacitance variation value of each sensed point and that of an adjacent sensed point to define as a slope of the sensed signal, select the sensed point having the difference value greater than the noise ripple value $dVR_{noise}$, and compare the capacitance variation value of the selected sensed point with those of the adjacent sensed points, if the capacitance variation value of the selected sensed point is a maximum, determine the selected sensed point as a sensed point touched by the stylus (S12).

Determine if the current sensing frame has any sensed point touched by the stylus (S13). If negative, update the base value (S14) and resume (S11) after receiving next sensing frame. Otherwise, resume (S11) after receiving next sensing frame.

Figure 1D:
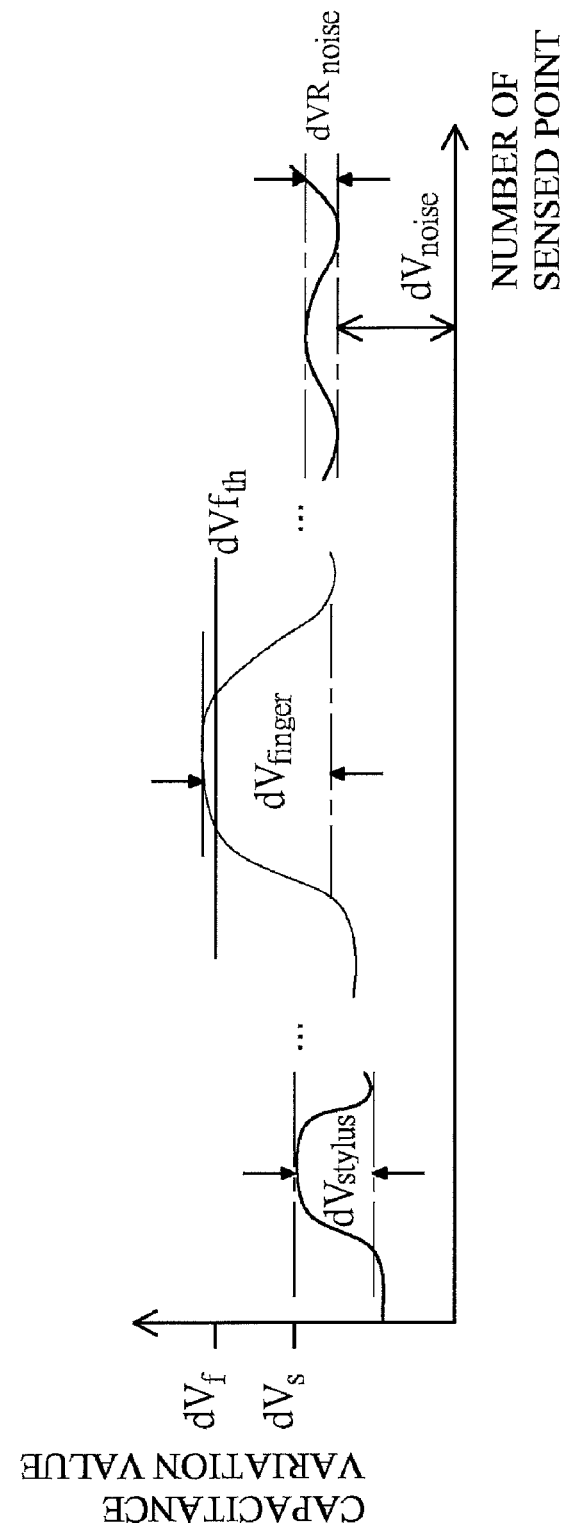
FIG. 1D is schematic view of capacitance variation values corresponding to a stylus, a finger and noises on a sensing frame in accordance with the present invention.

With reference to FIGS. 1B and 1D, a second embodiment of a method for identifying touch object in accordance with the present invention is applied to the touch panel capable of being touched by fingers and a stylus, and has the following steps.

Preset a noise ripple value $dVR_{noise}$ as a slope for noise signal and a capacitance variation threshold for finger $dVf_{th}$ (S10').

Acquire capacitance variation values of all sensed points in a sensing frame (S11'). The capacitance variation value of each sensed point is equal to a value of subtracting a capacitance value of a corresponding true sensed signal from a base value and is positive.

Obtain a difference value between the capacitance variation value of each sensed point and that of an adjacent sensed point to define as a slope of the sensed signal, select the sensed point having the difference value less than the noise ripple value $dVR_{noise}$, compare the capacitance variation value of the sensed point with the capacitance variation threshold for finger $dVf_{th}$, and If the capacitance variation value of the sensed point is greater than the $dVf_{th}$, determine that the capacitance variation value of the sensed point is not a liquid crystal module (LCM) noise (S12').

Compare the capacitance variation value of the sensed point which has difference value greater than the noise ripple value $dVR_{noise}$ with those of the adjacent sensed points, and if the capacitance variation value of the sensed point is a maximum, determine the sensed point as a point touched by the stylus (S13').

Determine if the capacitance variation value of each sensed point is not the non-LCM noise or sensed point touched by the stylus (S14'). If negative, update the base value (S15') and resume (S11') after receiving next sensing frame. Otherwise, resume (S11') after receiving next sensing frame.

With reference to FIG. 1C, each step (S14, S15') of updating the base value in the foregoing two embodiments has the following sub-steps.

Sequentially obtain the capacitance variation values and a minimum of the capacitance variation values of all sensed points on each column through all the columns of each sensing frame (S140).

Subtract the base value from the minimum capacitance variation value (S141).

Determine if the difference value is greater than zero (S142).

If positive, update the base value by adding the difference value to the base value for the row (S143).

Otherwise, keep the base value intact (S144).

As the base value for each row fluctuates after the touch panel is powered on, updating the base values can therefore enhance the precision of the present invention in terms of identification of points touched by the stylus.

Figure 2A:
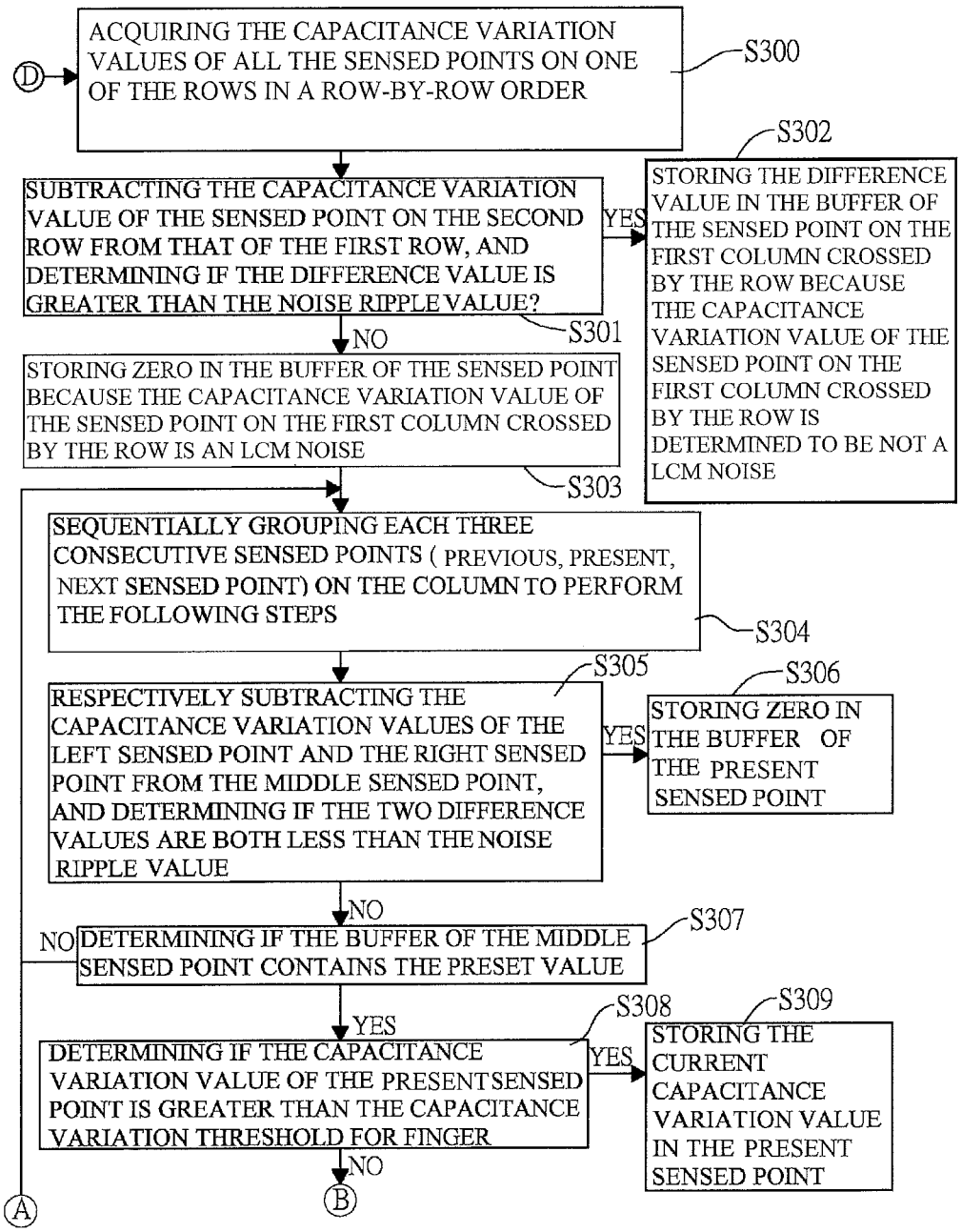
FIG. 2A is a detailed flow diagram of the method in FIG. 1B.
Figure 2B:
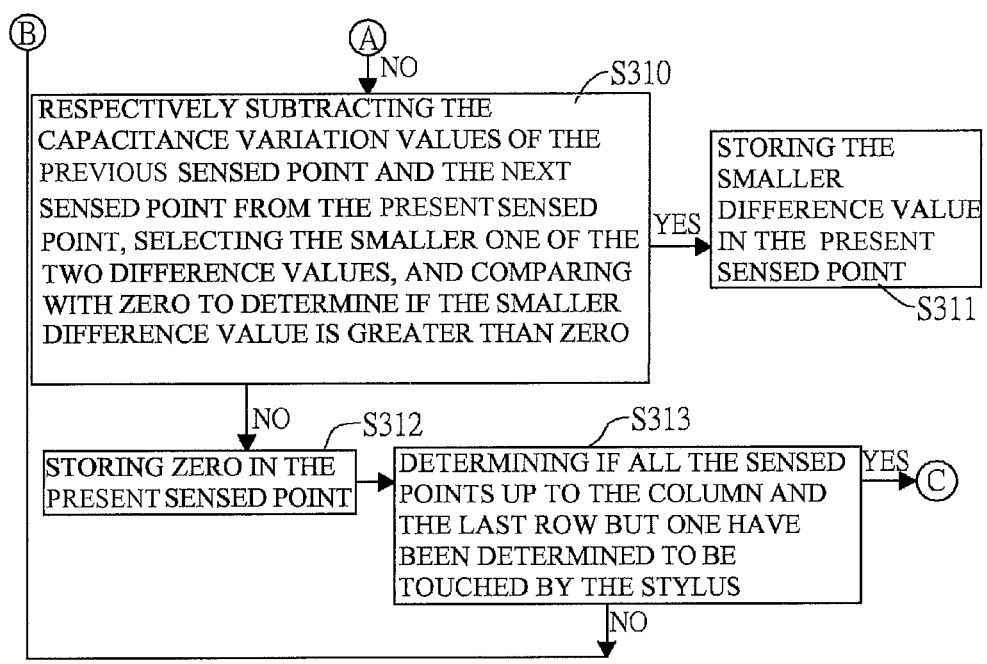
FIG. 2B is a flow diagram of a continued portion of the method in FIG. 2A.
Figure 2C:
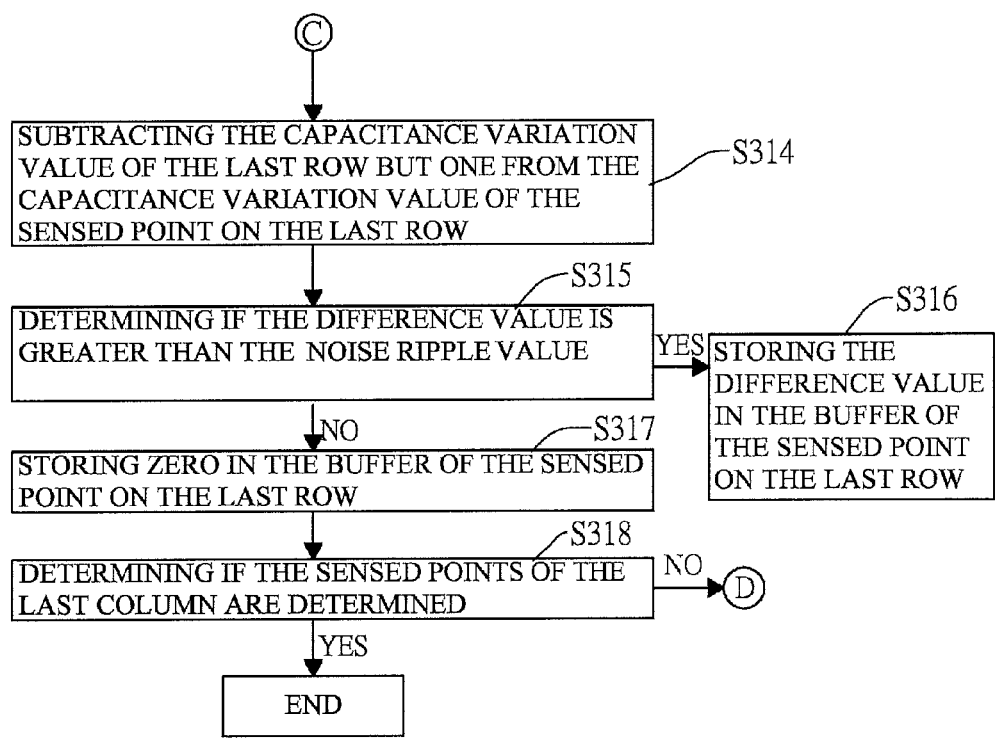
FIG. 2C is a flow diagram of a continued portion of the method in FIG. 2B.

With reference to FIGS. 2A to 2C, the step in FIG. 1C is further described in details as follows.

In the step S140, the sensing frame has multiple sensed points aligned in the form of a matrix with n rows and m columns. A buffer of each sensed point is stored with a preset value. In the present embodiment, the preset value is nonzero.

The buffers of the sensed points are sequentially stored column by column and row by row with zero, a difference value or a capacitance variation value respectively representing a code for LCM noise, a sensed signal of the stylus and a sensed signal of a finger. The physical implementation is as follows.

Acquire the capacitance variation values of all the sensed points on one of the rows in a row-by-row order (S300).

Subtract the capacitance variation value of the sensed point on the second column crossed by the row from that on the first column crossed by the row, and determine if the difference value is greater than the noise ripple value (S301).

If positive, store the difference value in the buffer of the sensed point on the first column crossed by the row because the capacitance variation value of the sensed point on the first column crossed by the row is determined to be not a LCM noise (S302).

If negative, store zero in the buffer of the sensed point because the capacitance variation value of the sensed point on the first column crossed by the row is an LCM noise (S303).

Further sequentially group each three consecutive sensed points (a previous sensed point, a present sensed point and a next sensed point on the row to perform the following steps (S304).

(a) Determination of an LCM Noise

Respectively subtract the capacitance variation values of the previous sensed point and the next sensed point from the present sensed point, and determine if the two difference values are both less than the noise ripple value (S305). For example, if the present sensed point is the second sensed point on the row crossed by the second column, the previous sensed point will be a first sensed point and the next sensed point will be third sensed point. One of the difference values is calculated by subtracting the capacitance variation value of the first sensed point from that of the second sensed point, and the other one is calculated by subtracting the capacitance variation value of the third sensed point from that of the second sensed point.

If positive, store zero in the buffer of the present sensed points (S306).

Otherwise, first determine if the buffer of the present sensed point contains the preset value (S307), which indicates that the sensed point has not been determined yet, and then perform the following steps.

(b) Determination of a Sensed Point Touched by a Finger

Determine if the capacitance variation value of the present sensed point is greater than the capacitance variation threshold for finger (S308).

If positive, store the current capacitance variation value in the buffer of the present sensed point because the present sensed point is determined to be a point touched by a finger (S309).

Otherwise, the present sensed point is determined to be a point touched by the stylus, and further determine the following steps.

(c) Determination of a Sensed Point Touched by the Stylus

Respectively subtract the capacitance variation values of the previous sensed point and the next sensed point from the present sensed point, select the smaller one of the two difference values and compare with zero to determine if the capacitance variation value of the present sensed point is greater than that of the previous or next sensed point (S310).

If the smaller difference value is greater than zero, store the smaller difference value in the buffer of the present sensed point because the present sensed point is determined to be a sensed point touched by the stylus (S311).

Otherwise, if the smaller difference value is less than zero, store zero in the buffer of the present sensed point because the sensed signal of the present sensed point is determined to be an LCM noise (S312).

Determine if all the sensed points on the present row crossed by the first column to a second to last column have been determined to be touched by the stylus (S313). Determination of the last sensed point on the row crossed by the last column is identical to the determination of the sensed points the row crossed by the first column.

Subtract the capacitance variation value of the sensed point on the row crossed by the second to last column from the capacitance variation value of the sensed point on the row crossed by the last column (S314).

Determine if the difference value is greater than the noise ripple value (S315).

If positive, store the difference value in the buffer of the sensed point on the row crossed by the last column because the capacitance variation value of the sensed point is determined to be not a LCM noise (S316).

Otherwise, store zero in the buffer of the sensed point on the row crossed by the last column because the sensed signal of the sensed point is determined to be an LCM noise (S317).

Resume step S300 until the sensed points of on the last row crossed by all the columns are determined (S318).

Figure 2D:
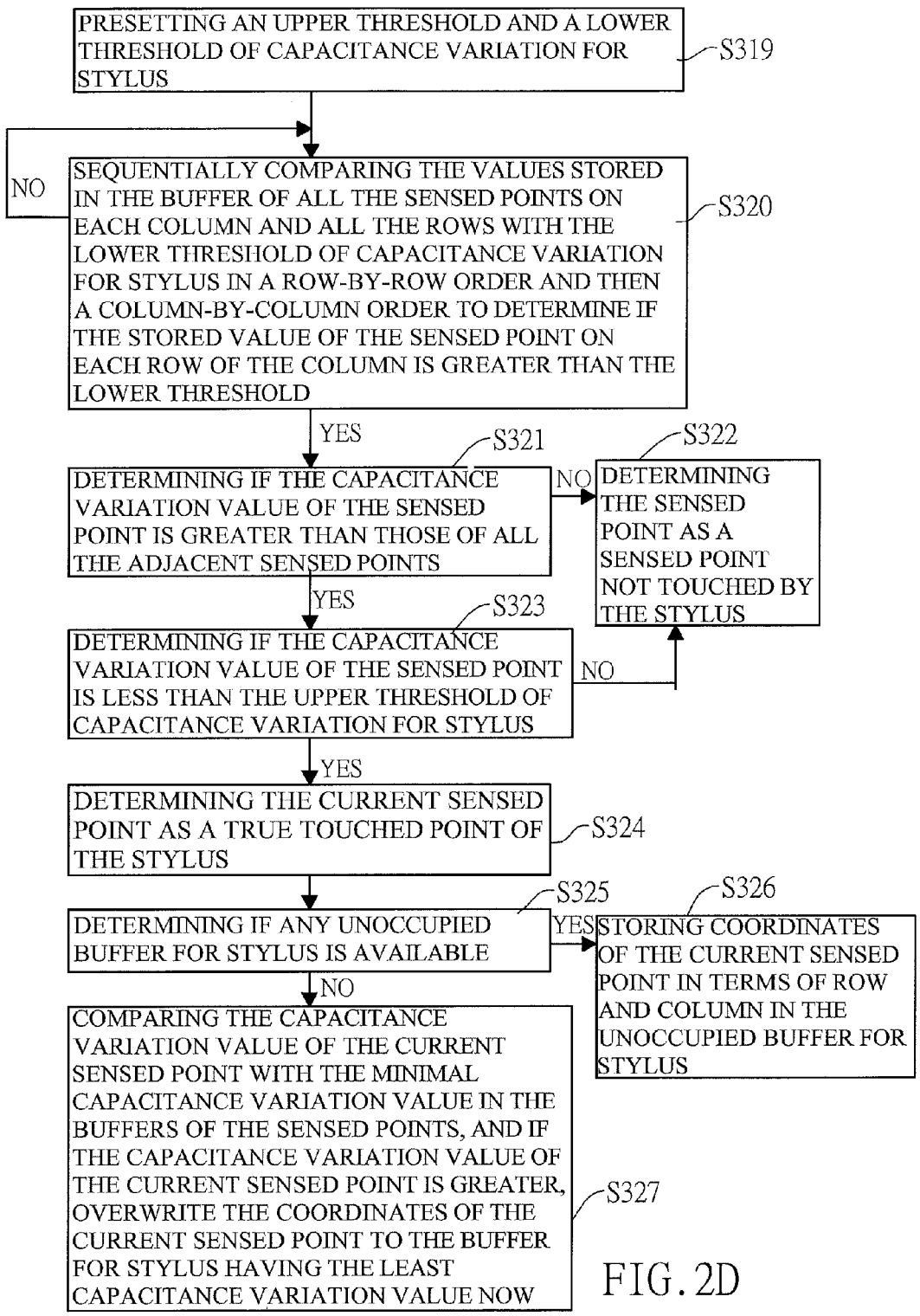
FIG. 2D a flow diagram of a step for identifying coordinates of touched points by a stylus of the method in FIG. 2C.

To further precisely identify the sensed points touched by the stylus, with reference to FIG. 2D, the values stored in the buffer of each sensed point can be further determined by the following steps:

Preset an upper threshold and a lower threshold of capacitance variation for stylus (S319).

Compare the values stored in the buffers of all the sensed points on one of the rows with the lower threshold of capacitance variation for stylus in a row-by-row order to determine if the stored value of the sensed point on the row crossed by each column is greater than the lower threshold (S320).

If positive, determine if the capacitance variation value of the sensed point is greater than those of all the adjacent sensed points (S321).

If negative, determine the sensed point as a sensed point not touched by the stylus (S322).

If positive, determine if the capacitance variation value of the sensed point is less than the upper threshold of capacitance variation for stylus (S323).

If positive, determine the present sensed point as a true touched point of the stylus (S324).

If the present invention is applied to a multi-touch touch panel, there is a chance that multiple sensed points may be determined as the touched points of the stylus in the present steps. For such application, according to the specification of an applicable touch panel, for example, if five styluses are allowed in operation, multiple (5) buffers for stylus need to be prepared beforehand.

When identifying true sensed points touched by the styluses, first determine if any unoccupied buffer for stylus is available (S325).

If positive, store coordinates of the present sensed point in terms of column and row associated with the unoccupied buffer for stylus (S326).

If there is a sixth sensed point qualifying for the determination under the same specification, the capacitance variation value of the sixth sensed point is further compared with the minimal capacitance variation value of the five sensed points. If the capacitance variation value of the sixth sensed point is greater, the coordinates thereof are overwritten to the buffer for stylus having the least capacitance variation value (S327). Up to here, coordinates of sensed points for single stylus or multiple styluses can be identified.

However, coordinates of a stylus effective for the controller of a touch panel to use fail to be calculated by interpolation using coordinates of single sensed point. At least 2*2 sensed points arranged in a two-by-two array within the matrix of the sensing frame are required to calculate actual coordinates of positions touched by the stylus. With reference to FIGS. 3A to 3D, coordinates of a single sensed point whose capacitance variation value must be greater than that of the rest of three sensed points are identified through the methods and step in FIGS. 2A to 2D. Effective coordinates of the rest of three sensed points can be further identified, and there are four possibilities described as follows.

Figures 3A, 3B, 3C, 3D:
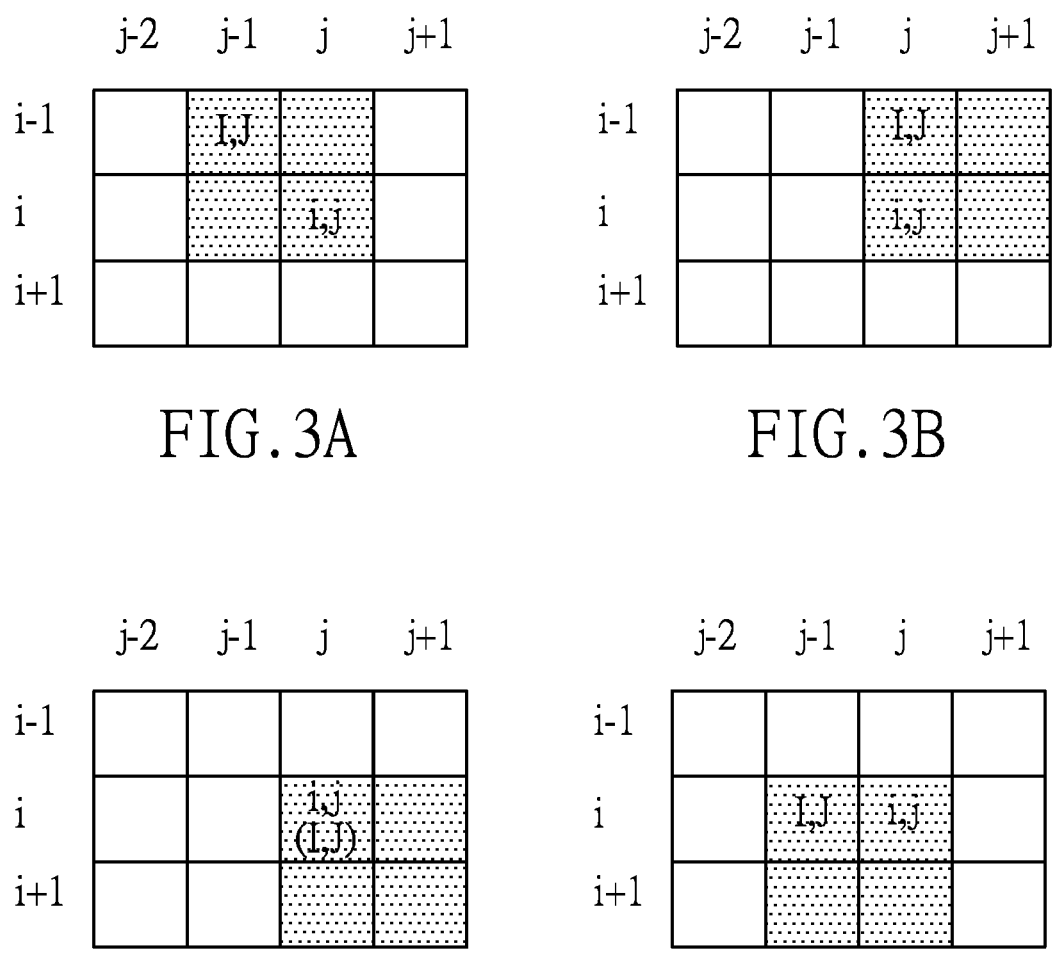

Suppose that the coordinates of column and row (I, J) of a single sensed point is the coordinates of (i, j) of a present sensed point, the capacitance variation values of the sensed points on the previous row (j−1) and next row (j+1) of the single sensed point are compared, and there are four possibilities as shown in FIGS. 3A to 3D. When the capacitance variation value of the previous row (j−1) is greater than that of the next row (j+1), the coordinate of row (J) for the sensed point on the upper left corner may map the coordinate of row for the sensed point on the upper left corner of the dotted 2*2 array as shown in FIG. 3A or 3D. Next, the capacitance variation values of the sensed points on the previous column (i−1) and next column (i+1) of the single sensed point are then compared to determine the coordinate of column for the single sensed point on the upper left corner of the dotted 2*2 array. The coordinate of column (I) for the sensed point on the upper left corner maps the coordinate of row for the sensed point on the upper left corner of the dotted 2*2 area as shown in FIG. 3A if the capacitance variation value of the previous column (i−1) is greater than that of the next column (i+1), or maps that as shown in FIG. 3D otherwise. Similarly, when the capacitance variation value of the previous row (j−1) is less than that of the next row (j+1), the coordinate of row (J) for the sensed point on the upper left corner may map the coordinate of row for the sensed point on the upper left corner of the dotted 2*2 array as shown in FIG. 3B or 3C. Next, the capacitance variation values of the sensed points on the previous column (i−1) and next column (i+1) of the single sensed point are then compared to determine the coordinate of column for the single sensed point on the upper left corner of the dotted 2*2 array. The coordinate of column (I) for the sensed point on the upper left corner maps the coordinate of row for the sensed point on the upper left corner of the dotted 2*2 area as shown in FIG. 3B if the capacitance variation value of the previous column (i−1) is greater than that of the next column (i+1), or maps that as shown in FIG. 3C otherwise. Once the coordinates (I, J) of the single sensed point on the upper left corner are determined, the coordinates of all the sensed points on the 2*2 array can be determined.

Moreover, to precisely calculate the coordinates touched by the stylus by interpolation, the values of LCM noise and vertical noise must be deducted from the capacitance variation values of the sensed points in the 2*2 array. With reference to FIGS. 4A to 4D, the sensed points in the 2*2 array determined in FIG. 3A and respectively having the capacitance variation values, dV11, dV12, dV21 and dV22, are shown. The minimum values of the capacitance variation values B11, B12 of the sensed points on the previous adjacent row j−2 and the next adjacent row j+1 on the same column i−1 are respectively deducted from the original capacitance variation values, dV11 and dV12, and the maximum values of zero and the difference values are respectively taken to obtain first capacitance variation values W11 and W12 as shown in Eqns 1 and 2 Similarly, first capacitance variation values W21 and W22 can be obtained by respectively deducting the minimum values B21, B22 of the capacitance variation values of the sensed points on the previous adjacent row j−2 and the next adjacent row j+1 on the same column i from the original capacitance variation values, dV21 and dV22, and respectively taking the maximum values of zero and the difference values as shown in Eqns 3 and 4. Next, the capacitance variation values of the sensed points A11 and A12 on the rows j−1 and j and the column i−2 respectively minus the capacitance variation values of another two adjacent sensed points A10 and A13 on the same column to obtain respective capacitance variation difference values A11' and A12'. Similarly, the capacitance variation values of the sensed points A21 and A22 on the rows j−1 and j and the column i+1 respectively minus the capacitance variation values of another two adjacent sensed points A20 and A23 on the same column to obtain capacitance variation difference values A21' and A22'. Thus, the LCM noises can be deducted from the capacitance variation difference values A11', A12', A21' and A22'. The minimum value of the capacitance variation difference values A11' and A21' on the row j−1 and the columns i−2 and i+1 is deducted from the first capacitance variation values, W11 and W21, on the columns i−1 and i and the row j−1, and the maximum of zero and each difference value is taken to obtain a corresponding actual capacitance variation value W11' and W21' on the columns i−1 and i and the row j−1 as shown in Eqns 5 and 7. Similarly, actual capacitance variation value W12' and W22' on the columns i−1 and i and the row j can be obtained by deducting the minimum value of the capacitance variation difference values A12' and A22' on the same row from the first capacitance variation values, W12 and W22, on the columns i−1 and i and the row j and taking the maximum value of zero and each difference value as shown in Eqns 6 and 8. The actual capacitance variation values W11', W12', W21' and W22' are employed to calculate the effective coordinates of a sensed point touched by the stylus by interpolation.

$$W11=\max(0,dV11-\min(B11,B12))) \quad (1)$$

$$W12=\max(0,dV12-\min(B11,B12))) \quad (2)$$

$$W21=\max(0,dV21-\min(B21,B22))) \quad (3)$$

$$W22=\max(0,dV22-\min(B21,B22))) \quad (4)$$

$$W11'=\max(0,W11-\min(A11',A21'))) \quad (5)$$

$$W12'=\max(0,W12-\min(A12',A22'))) \quad (6)$$

$$W21'=\max(0,W21-\min(A11',A21'))) \quad (7)$$

$$W22'=\max(0,W22-\min(A12',A22'))) \quad (8)$$

As the slopes of the capacitance variation values of the sensed points within a touch range for fingers and the stylus are relatively high, the present invention respectively determines the difference values between the capacitance variation values of relevant sensed points within the touch range, defines the difference values as the slopes, and compares with the noise ripple value. If the difference values less than the noise ripple value, the capacitance variation values of the sensed points are determined to be caused by noises. Otherwise, the sensed points may be touched by a finger or a stylus. Furthermore, the capacitance variation value of the sensed point is compared with those of adjacent sensed points to determine if it is a maximum. If positive, the sensed point can then be determined to be touched by a stylus instead of a finger. Accordingly, the method of the present invention can truly eliminate the LCM noises and correctly identify actual sensed points touched by the stylus.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A method for identifying touch object on to a touch panel, the method comprising:
   (A) reading m capacitance variation values on a first direction, wherein the m capacitance variation values respectively correspond to m sensed units of the touch panel;
   (B) determining whether a difference value between the capacitance variation value of a $k^{th}$ sensed unit and that of another sensed unit is larger than a preset noise ripple value, wherein k is equal to or smaller than m and m is a positive integer;
   (C) determining whether the capacitance variation value of the $k^{th}$ sensed unit is larger than those of the adjacent sensed units; and (D) determining a touch stylus touched on the touch panel when the difference value is larger than the preset noise ripple value and the capacitance variation value of the $k^{th}$ sensed unit is larger than those of the adjacent sensed units.

2. The method as claimed in claim 1, wherein the method is applied to a self-sensing sensing frame, and the sensed unit is a sensed line.

3. The method as claimed in claim 1, wherein the method is applied to a full mutual-scanning sensing frame and the sensed unit is a sensed point.

4. The method as claimed in claim 3, wherein in the step (B), when the difference value is smaller than the preset noise ripple value the, the step (B) further comprising:
comparing the capacitance variation value of the $k^{th}$ sensed unit with a capacitance variation threshold for finger, and if the capacitance variation of the $k^{th}$ sensed unit is greater than the capacitance variation threshold for finger, determining that the capacitance variation of the $k^{th}$ sensed unit is not a liquid crystal module noise.

5. The method as claimed in claim 1, wherein the capacitance variation value of each sensed unit is equal to a value subtracting a capacitance value of a corresponding true sensed signal from a base value.

6. The method as claimed in claim 5, further comprising a step of updating the base value performed when no touch stylus touched on the touch panel is determined, wherein the step of updating the base value comprises:
(a1) obtaining the capacitance variation values of the m sensed units, and a minimum of the capacitance variation values of the m sensed units;
(a2) subtracting the base value from the minimum of the capacitance variation values;
(a3) determining if the difference value of the step (a2) is greater than zero; and
(a4) if positive, updating the base value by adding the difference value of the step (a2) to the base value of each sensed unit.

7. The method as claimed in claim 1, wherein
in the step (B), taking each three adjacent sensed units as a group, wherein the three adjacent sensed units of each group comprise a previous, a present and a next sensed unit in a position sequence, the step (B) comprises:
(a) respectively subtracting the capacitance variation values of the previous sensed unit and the next sensed unit from the present sensed unit to obtain two difference values;
determining if the two difference values of the step (a) are both less than the noise ripple value;
if positive, storing zeros in the buffer of the present sensed unit;
(b) if negative in the step (a), determining if the capacitance variation value of the present sensed unit
(c) if negative in the step (b), respectively subtracting the capacitance variation values of the previous sensed unit and the next sensed unit from the capacitance variation values of the present sensed unit to obtain two different values;
selecting the smaller one of the two difference values of the step (c) to compare with zero;
if the smaller difference value is greater than zero, storing the smaller difference value in the present sensed unit;
if the smaller difference value is less than zero, storing zero in the buffer of the present sensed unit.

8. The method as claimed in claim 7, further comprising:
presetting an upper threshold and a lower threshold of capacitance variation for stylus; and
if the value stored in the buffer of the sensed unit is greater than the lower threshold of capacitance variation for stylus, and is less than the upper threshold of capacitance variation for stylus, determining the sensed unit touched by the stylus.

9. A method for identifying touch object on a touch panel, the method comprising:
(A) reading m capacitance variation values on a first direction, wherein the m capacitance variation values respectively correspond to m sensed units of the touch panel;
(B) determining whether a difference value between the capacitance variation value of a $k^{th}$ sensed unit and that of another sensed unit is larger than a preset noise ripple value, wherein k is equal to or smaller than m and m is a positive integer; and
(C) determining that the capacitance variation value of the $k^{th}$ sensed unit is not a liquid crystal module noise when the difference value is larger than the preset noise ripple value.

10. The method as claimed in claim 9, wherein the method is applied to a self-sensing sensing frame, and the sensed unit is a sensed line.

11. The method as claimed in claim 9, wherein the method is applied to a full mutual-scanning sensing frame and the sensed unit is a sensed point.

12. The method as claimed in claim 9, wherein in the step (B), when the difference value is smaller than the preset noise ripple value, the step (B) further comprising:
comparing the capacitance variation value of the $k^{th}$ sensed unit with a capacitance variation threshold for finger, and if the capacitance variation of the $k^{th}$ sensed unit is greater than the capacitance variation threshold for finger, determining that the capacitance variation value of the $k^{th}$ sensed unit is not the liquid crystal module noise.

13. The method as claimed in claim 9, wherein the capacitance variation value of each sensed unit is equal to a value subtracting a capacitance value of a corresponding true sensed signal from a base value.

14. The method as claimed in claim 9, further comprising a step of updating the base value performed when the capacitance variation value of each sensed unit is not determined to be not the liquid crystal module noise, wherein the step of updating the base value has steps of:
(a1) obtaining the capacitance variation values of the m sensed units, and a minimum of the capacitance variation values of the m sensed units;
(a2) subtracting the base value from the minimum of the capacitance variation values;
(a3) determining if the difference value of the step (a2) is greater than zero; and
(a4) if positive, updating the base value by adding the difference value of the step
(a2) to the base value of each sensed unit.

15. The method as claimed in claim 9, wherein
in the step (B), taking each three adjacent sensed units as a group, wherein the three adjacent sensed units of each group comprise a previous, a present and a next sensed unit in a position sequence, the step (B) comprising:
respectively subtracting the capacitance variation values of the previous sensed unit and the next sensed unit from the present sensed unit to two difference values;
determining if the two difference values of the step (a) are both less than the noise ripple value;
if positive, storing zeros in the buffer of the present sensed unit;

(b) if negative in the step (a), determining if the capacitance variation value of the present sensed unit is greater than the capacitance variation threshold for finger;
if positive, storing the current capacitance variation value in the buffer of the present sensed unit
(c) if negative in the step (b), respectively subtracting the capacitance variation values of the previous sensed unit and the next sensed unit from the capacitance variation values of the present sensed unit to obtain two difference values;
selecting the smaller one of the two difference values of the step (c) to compare with
if the smaller difference value is greater than zero, storing the smaller difference value in the buffer of the present sensed unit;
if the smaller difference value is less than zero, storing zero in the buffer of the present sensed unit.

16. The method as claimed in claim 15, further comprising:
presetting an upper threshold and a lower threshold of capacitance variation for stylus; and
if the value stored in the buffer of the sensed unit is greater than the lower threshold of capacitance variation for stylus, and is less than the upper threshold of capacitance variation for stylus, determining the sensed unit is touched by the stylus.

* * * * *